(12) United States Patent
Constant

(10) Patent No.: US 7,618,024 B2
(45) Date of Patent: Nov. 17, 2009

(54) APPARATUS AND METHOD TO FACILITATE LOADING AND UNLOADING OF PASSENGER VEHICLE CARGO

(76) Inventor: Jesse Constant, 9700 Coneflower Dr. NW., Albuquerque, NM (US) 87114

( * ) Notice: Subject to any disclaimer, the term of this patent is extended or adjusted under 35 U.S.C. 154(b) by 280 days.

(21) Appl. No.: 11/809,826

(22) Filed: Jun. 1, 2007

(65) Prior Publication Data
US 2007/0278464 A1    Dec. 6, 2007

Related U.S. Application Data

(60) Provisional application No. 60/809,944, filed on Jun. 1, 2006.

(51) Int. Cl.
*B66D 3/08* (2006.01)
(52) U.S. Cl. .................. 254/394; 254/398; 254/399; 254/413
(58) Field of Classification Search ............. 254/393, 254/394, 398, 399, 413
See application file for complete search history.

(56) References Cited

U.S. PATENT DOCUMENTS

| | | | | |
|---|---|---|---|---|
| 1,785,090 A | * | 12/1930 | Jacoby | 254/337 |
| 5,067,709 A | * | 11/1991 | Christianson | 482/95 |
| 5,193,479 A | * | 3/1993 | Bielefeld | 114/366 |
| 6,056,274 A | * | 5/2000 | Naas et al. | 254/335 |
| 6,631,885 B2 | * | 10/2003 | Halas | 254/225 |
| 7,007,927 B2 | * | 3/2006 | Halas | 254/225 |
| 7,093,823 B2 | * | 8/2006 | Sevalie' | 254/337 |
| 7,380,771 B1 | * | 6/2008 | Joy et al. | 254/394 |

* cited by examiner

*Primary Examiner*—Emmanuel M Marcelo
(74) *Attorney, Agent, or Firm*—Bauman, Don & León, P.C.; Alberto A. León; Simone M. Seiler

(57) ABSTRACT

The invention comprises an anchor, rope and pulley system to load and unload cargo into and out of passenger vehicles. The anchor system comprises two load bearing straps and a means to attach the straps together. The straps are looped around the vehicle's side handle grips. The looped straps attach to each other near the center of the cargo area. The rope and pulley system comprises a rope, a large pulley, a small pulley, a means to attach the rope and pulley system to the anchor system, a means to attach the cargo to the rope and pulley system, and a means to clamp the rope to create a handle. Cargo can be lifted into a vehicle by pulling the handle with one hand and guiding the cargo with the other hand. A durable guard material over the cargo area's point of entry protects the vehicle and cargo from damage.

9 Claims, 2 Drawing Sheets

APPARATUS AND METHOD TO FACILITATE LOADING AND UNLOADING OF PASSENGER VEHICLE CARGO

CROSS-REFERENCE TO RELATED APPLICATION

I hereby claim the benefit under Title 35, United States Code Section 119(e) of any United States Provisional Application(s) listed below:

Application No. 60/809,944

Filing Date: Jun. 1, 2006

TECHNICAL FIELD OF THE INVENTION

This invention relates generally to lifting devices. More particularly, this invention relates to a device used to facilitate the loading and unloading of vehicle cargo. Even more particularly, this invention relates to a simple portable cargo lifting configuration that can be used by one person to facilitate moving cargo into and out of a passenger vehicle's cargo storage area which can be sold as a kit or as an accessory in new cars.

BACKGROUND OF THE INVENTION

People often need to place things inside their car's trunk, SUV's cargo area, pickup's bed, into loading docks or into buildings through a window or other opening. Most people perform the task of lifting the item into the cargo area without a second thought, resulting, in some cases, in back or other injuries. In some cases, because of the shape or weight of the object being lifted, additional human or technical assistance becomes necessary.

To date, there are several known devices designed to assist the loading and unloading of motor vehicle cargo. The most common of these devices are electrically-powered lift platforms, such as those traditionally used for wheelchairs, such as Butler, U.S. Pat. No. 6,769,858, Dehl, Pat. No. RE39,646, Hock, U.S. Pat. No. 4,252,491, and Tauer, Pat. No. RE29,175. Lift platforms are usually permanently installed and have the flexibility to be installed on a passenger car, sport utility vehicle, van or pickup truck. However, they tend to be prohibitively expensive and unsuitable for occasional use. Many have the additional disadvantage of storing the cargo on the outside of the vehicle, where it can be stolen.

The majority of other devices for loading and unloading vehicle cargo are suitable only for pickup trucks or cargo vans due to the height requirements of the devices. There are two common categories of loading devices limited to use in pickup trucks and cargo vans. The first is a tilting cargo bed, such as in Palmer, Jr. et al, U.S. Pat. No. 5,509,775 and Copus, U.S. Pat. No. 7,125,082. The second category comprises a hoist or a boom. The cargo is generally loaded using a winch or hydraulics, which requires electrical power. Examples of loading devices using hoists or booms include Woods, Jr. U.S. Pat. No. 6,612,549, James, U.S. Pat. No. 4,239,440, Duncan, U.S. Pat. No. 5,730,304, Rolfe, U.S. Pat. No. 4,355,942, and Lombard, U.S. Pat. No. 5,007,794.

Very few loading and unloading devices are compatible for ordinary passenger vehicles. One such device is Breaux's Ramp and Cargo System, U.S. Pat. No. 6,379,101, which is a ramp with an external storage deck. This device probably works best with cargo vans and pickup trucks, but may be servicable with sport utility vehicles (SUVs) and other vehicles that have a hatchback. However, the vehicle must have a trailer hitch for mounting the storage deck, and a large area must be available outside of the cargo door of the vehicle to allow for use of the ramp. It may be dangerous to use the ramp in the parking lot or other area in close proximity to moving vehicles.

Therefore, most devices are complicated, take up significant space within the vehicle, require a modification to the vehicle, and are permanently attached to the vehicle. Additionally, most devices are designed to lift hundreds to thousands of pounds. Moreover, most devices operate off of hydraulic, pneumatic, electric, or battery power, so an external power source is almost always required. In short, the existing devices are not user friendly, portable, readily affordable or appropriate for use in smaller passenger vehicles. Accordingly, these devices are primarily used in specific commercial applications.

SUMMARY OF THE INVENTION

The present invention enables a single person of average or less than average strength to load and unload a cargo into and out of their passenger vehicle. Unlike existing devices, this invention is not permanently attached to the vehicle, can be sold as a kid adaptable to most vehicles or can be an accessory which comes with the vehicle upon purchase. The device of this invention is temporarily anchored to the vehicle by looping straps around the side handle grips located above the windows. Additionally, there are no hydraulic or electric mechanisms to install and maintain, and no external power source is necessary. The device comprises a simple assembly of straps, ropes, pulleys, and clips. Most people can load the cargo by pulling on the system with one hand and guiding the cargo into the vehicle with the other hand. The simplicity of the invention makes it user friendly, portable, and readily affordable. Moreover, the invention is designed for common everyday usage, but it is suitable for some commercial applications as well. The invention can be sold in stores as a kit, available as an auto accessory through the auto manufacturer, or sold with heavy items that need to be repeatedly loaded and unloaded from a vehicle.

DETAILED DESCRIPTION OF THE PREFERRED EMBODIMENT OF THE INVENTION

The preferred embodiment of the present invention is a portable passenger-vehicle cargo-lifting device comprising an anchor system, a rope and pulley system, and means to temporarily attach the rope and pulley system to the vehicle on one end and to the cargo on the other end.

Figure 1:
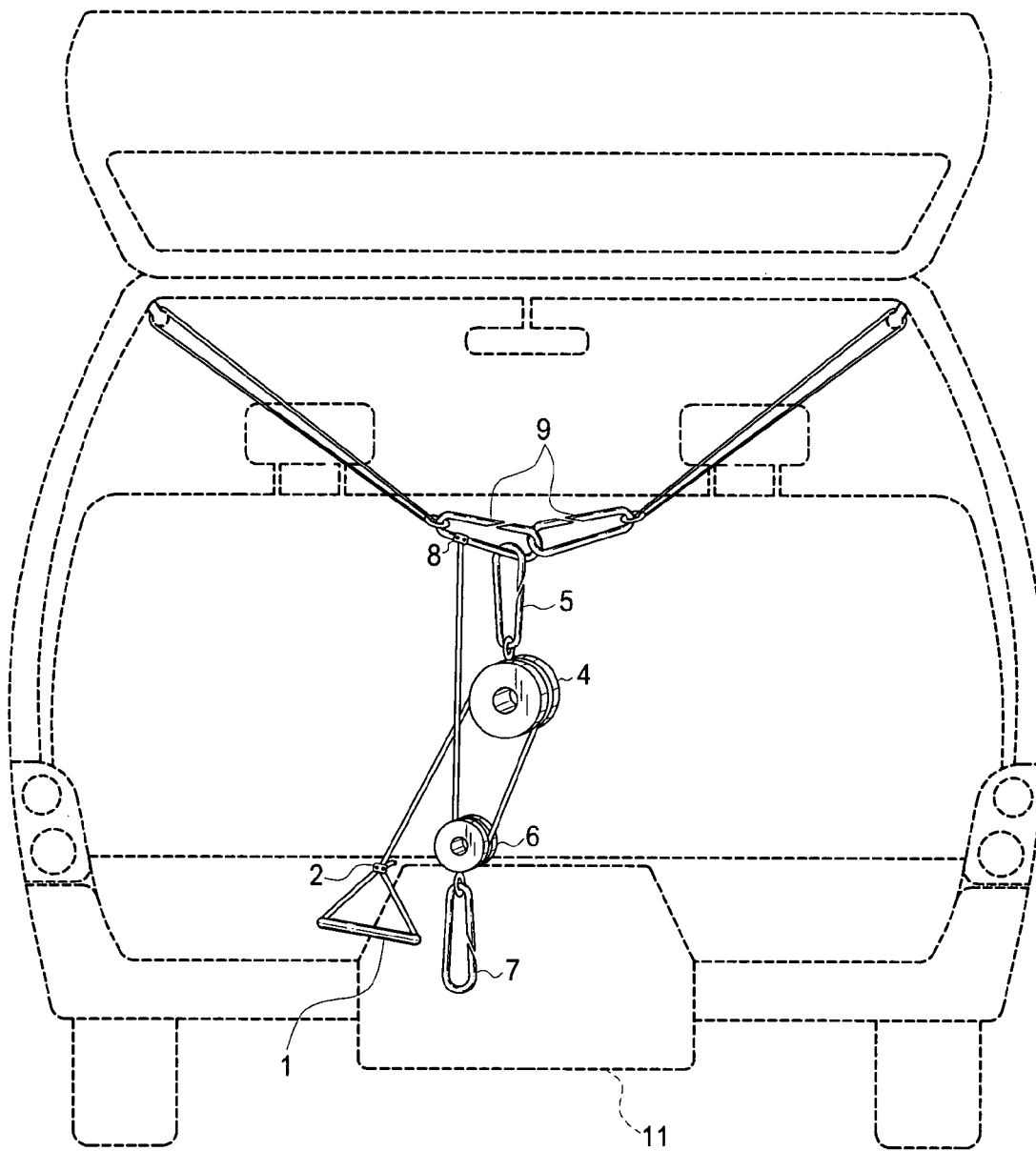
FIG. 1 is a frontal view of the invention installed in the rear of an SUV passenger vehicle.
Figure 2:
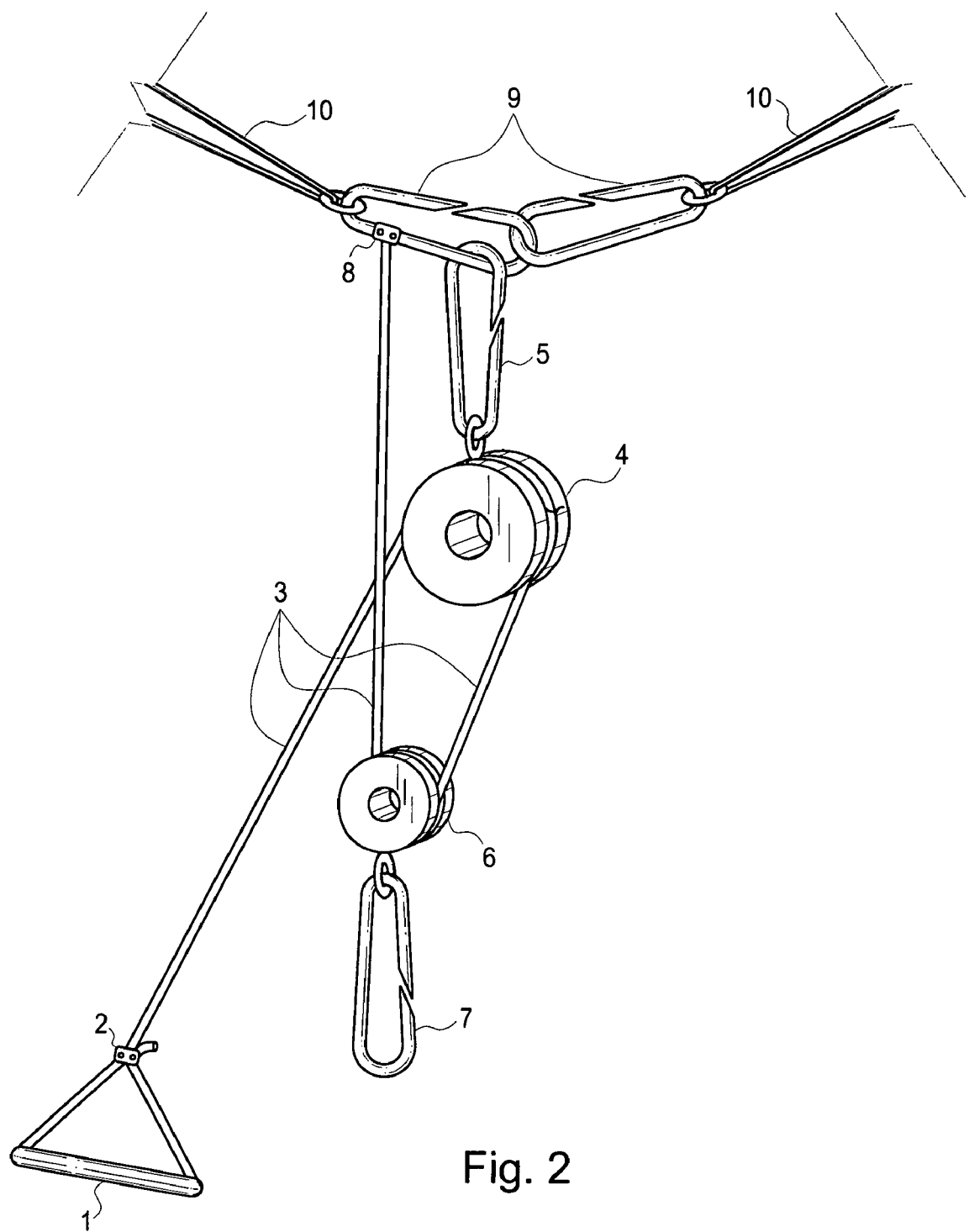
FIG. 2 is a frontal view of the invention.

Specifically, the type of vehicle envisioned in the preferred embodiment of the invention is a personal passenger vehicle such as an SUV, hatchback, or station wagon (FIG. 1). As just one of many examples, a parent could use the cargo lifting device to load and unload crates of their kids' soccer or softball equipment from the rear cargo area of their family vehicle. Alternatively, the cargo-lifting device of the invention can assist an elderly person load and unload luggage from the rear cargo area of their hatchback, station wagon, SUV or any other type of vehicle with a rear door. The cargo weight limit of the preferred embodiment is approximately two hundred (200) pounds.

The invention's anchor system comprises two load bearing straps (10) that can be looped independently and temporarily attached together. Each strap (10) has a front end and a back end, each load bearing strap further comprises a receiving adhesive means extending from the load bearing strap's front end and an attaching adhesive means extending from the load bearing strap's back end. In the preferred embodiment, the receiving adhesive means and the attaching adhesive means are manufactured using Velcro®, although other temporary or permanent means of adhesion could be used in alternative embodiments. In the preferred embodiment, the load bearing straps (10) are looped around the vehicle's existing handle grip located above each side passenger window. In other types of vehicles, there may be other appropriate anchor points within the cargo area around which the load bearing straps (10) could be looped. The straps (10) should be an appropriate length, so that when the straps (10) are looped around the handle grips and their front and back ends attached together, the looped straps (10) extend into the cargo area leaving enough room for the strap attachment means (9) to clip together. In this preferred embodiment, the strap attachment means (9) comprises two 3-inch metal carabiners, where each carabiner is clipped to one of the load bearing straps and then clipped to the other carabiner. In an alternative embodiment, the attachment means can be a hook or clip, and the attachment means can attach to a third hook, clip or carabiner, rather than to each other.

The rope and pulley system comprises a rope (3), a large pulley (4), a small pulley (6), and a handle (1). The rope (3) comprises a front end and a back end with the back end of the rope being removably attached to the strap attachment means of the anchor system (9). In the preferred embodiment of the invention, the back end of a one-half inch diameter rope is attached to one of the carabiners that are used to attach the load bearing straps together, using a rope attaching means (8). In the preferred embodiment, the rope attachment means is a metal screw-tightened cable clamp. In alternative embodiments, the rope attachment means could be a knot, clamp or other means. In another alternative embodiment, a metal cable or other non-elastic, appropriately strong cable, rope or line can be used in place of the one half inch rope. After being securely attached to the anchor system, the rope (3) is then extended through the small pulley (6). In the preferred embodiment, the small pulley (6) is one inch in diameter. The rope (3) is then extended through the large pulley (4), which is three inches in diameter. Therefore, in the preferred embodiment, which works well with an average-sized passenger vehicle with a hatchback cargo area, the ratio of the diameter of the large pulley (4) to the diameter of the small pulley (6) is three to one. When the ratio of the pulley diameters in increased, the effort required by the user to load and unload cargo is decreased. When choosing the size of pulleys for alternative embodiments, consideration should be given to the ratio of pulley sizes such that the ease of using the cargo lifting apparatus is balanced with the amount of cargo area that is taken up by the pulleys themselves. In embodiments with heavier cargo and sturdier anchor points than vehicle handle grips, the size of the pulleys may be increased, if cargo space permits.

After being extended through the large pulley, the rope (3) is extended to the opening of the cargo area and through a hollow rigid plastic tube. The rope is then looped back on itself and clamped to form a handle (1). The hollow plastic tube is at least an inch longer than the width of the average human hand. In the preferred embodiment, the rope is clamped using a metal screw-tightened cable clamp, which firmly holds the two sections of rope together. A person having ordinary skill in the art can easily imagine other means to grasp the front end of the rope, including simply tying a loop at the end of the rope itself or using a triangular metal or plastic handle or an ergonomically designed handle, perhaps comprised of a cushioned grip area with finger grooves.

The large pulley (4) is removably attached to the anchor system using a pulley attachment means (5), which in the preferred embodiment is a three-inch long carabiner. The small pulley (6) is removably attached to the cargo to be lifted using a cargo attachment means (7), which in the preferred embodiment is another three-inch long carabiner. This cargo attachment means (7) is removably clipped to any convenient and appropriately strong looped portion of the cargo, for example, the handle on a piece of luggage, the handle on a dolly or the looped handle of a shopping bag. In alternative embodiments, the pulley attachment means and the cargo attachment means can comprise a hook or clip.

The preferred embodiment also includes a bumper guard (11) made of a durable material, such as that consistent with a rug or carpet, which will protect the paint and frame of cargo door area of the vehicle from chips and scrapes while using the present invention.

The method of installing the present invention comprises the steps of attaching the cargo attachment means (7) to the small pulley (6), and attaching the pulley attachment means (5) to the large pulley (4). The next step comprises looping one of the load bearing straps (10) around a handle grip located above a vehicle's passenger's side window (FIG. 1). In alternative embodiments, the load bearing straps can be attached to a different anchor point within the vehicle's cargo area. The strap is then extended through the strap attachment means (9). The loop of the load bearing strap (10) is completed when the ends of the strap are attached to each other using the receiving and attaching adhesive means. The second strap (10) is similarly looped through a handle grip on the opposite side of the cargo area (FIG. 1), then through the strap attachment means (9), and the ends of the strap are attached to each other using the receiving and attaching adhesive means. The large pulley (4) is then attached to one of the strap attachment means (9) using the pulley attachment means (5). The back end of the rope (3) is then removably attached to the same strap attachment means using the rope attachment means (8). The front end of the rope is extended around the bottom of the small pulley (6), then around the top of the large pulley (4) and back to the cargo area door opening so that the front end is near the door opening. The front end of the rope (3) is extended through the hollow plastic tube and looped back on itself and secured in place using clamping means (2), which is a screw-tightened cable clamp, forming a handle (1). The length of the rope should be such that the cargo attachment means (7) is at the cargo area door opening and the handle (1) is within arm's length of the cargo area door opening. The length of the rope, and therefore, the distance that the handle has to be pulled to use the invention, can be adjusted by loosening the screws in the screw-tightened cable clamp adjacent to the handle, pulling the desired length of the front end of the rope through the cable clamp, and retightening the cable clamp.

The method of using the present invention comprises the steps of opening the vehicle's cargo door and positioning the cargo to be lifted near the center of the opened cargo door. The user then attaches the cargo attachment means (7) to the cargo to be loaded into the cargo area of the vehicle. The bumper guard (11) is positioned between the cargo and the vehicle's door opening to protect the paint and frame of the door opening. The user grasps the handle (1) and gently pulls it toward him or her while simultaneously using the other hand to guide the cargo into the vehicle's cargo area. To unload the cargo, the method is reversed, so that the user uses one hand to gently pull the cargo toward him or her while the other hand grasps the handle (1) and pulls the rope with enough force to allow the cargo to slowly and gently exit the cargo area of the vehicle.

These examples are not meant to limit the application of the present invention as a person having ordinary skill in the art could easily envision adapting the lifting device to loading and unloading cargo in the bed of a pickup truck, in the trunk of a car or even through a large window. Also, while the preferred embodiment of the present invention contemplates non-commercial uses, there are also many commercial embodiments of the invention such as moving cargo to and from a loading dock or forklift.

What is claimed is:

1. A portable passenger-vehicle cargo lifting system, comprising:
   a. an anchor system, the anchor system comprising two load bearing straps capable of being looped independently and a strap attachment means to removably attach together the independently looped load bearing straps, each load bearing strap comprising a front end and a back end, each load bearing strap further comprising a receiving adhesive means extending from the load bearing strap's front end and an attaching adhesive means extending from the load bearing strap's back end;
   b. a rope and pulley system, the rope and pulley system comprising a hollow rigid plastic tube, a rope, a large pulley, and a small pulley, the rope comprising a front end and a back end, the rope being capable of being threaded through the hollow rigid plastic tube, the hollow rigid plastic tube being at least one inch wider than the average human hand, and the rope being of such a length that when the lifting device is fully assembled and installed, the front and back ends of the rope rest near a door to a cargo area of the vehicle in which the lifting device is installed;
   c. a pulley attachment means to removably attach the large pulley to the anchor system;
   d. a rope attachment means to removably attach the rope's back end to the anchor system;
   e. a clamping means to removably attach the rope's front end to the rope to form a handle;
   f. a cargo attachment means to removably attach the small pulley to the cargo to be lifted; and
   g. a bumper guard manufactured from durable material, the bumper guard being capable of protecting the paint and frame of the bumper of a passenger vehicle's cargo door area while the cargo is loaded.

2. A portable passenger-vehicle cargo lifting device according to claim 1, wherein the strap attachment means is selected from the group consisting of carabiners, clips and hooks.

3. A portable passenger-vehicle cargo lifting device according to claim 1, wherein the pulley attachment means is selected from the group consisting of carabiners, clips and hooks.

4. A portable passenger-vehicle cargo lifting device according to claim 1, wherein the rope attachment means is a metal screw-tightened cable clamp.

5. A portable passenger-vehicle cargo lifting device according to claim 1, wherein the clamping means is a metal screw-tightened cable clamp.

6. A portable passenger-vehicle cargo lifting device according to claim 1, wherein the cargo attachment means is selected from the group consisting of carabiners, clips and hooks.

7. A portable passenger-vehicle cargo lifting device according to claim 1, wherein the rope is selected from the group consisting of, rope, metal cable, and other non-elastic rope, line or cable of appropriate strength to support the cargo being lifted.

8. A portable passenger-vehicle cargo lifting device according to claim 1, wherein the hollow rigid plastic tube is replaced by a pre-manufactured handle.

9. A method of using a portable passenger-vehicle cargo lifting device, comprising:
   a. attaching a cargo attachment means to a small pulley;
   b. attaching a pulley attachment means to a large pulley;
   c. opening a vehicle's cargo door;
   d. looping a load bearing strap around a handle grip located above the vehicle's passenger's side window;
   e. running the passenger's side load bearing strap through a strap attachment means;
   f. completing a loop of the passenger's side load bearing strap by attaching a receiving adhesive means to an attaching adhesive means;
   g. attaching the passenger's side strap attachment means to another strap attachment means;
   h. looping another load bearing strap around a handle grip located above the vehicle's driver's side window;
   i. running the driver's side load bearing strap through the other strap attachment means;
   j. completing a loop of the driver's side load bearing strap by attaching a receiving adhesive means to an attaching adhesive means;
   k. attaching the large pulley to the passenger's side strap attachment means using the pulley attachment means;
   l. attaching a rope's back end to the passenger's side strap attachment means using a rope attachment means;
   m. threading the rope's front end around the small pulley, extending it to the large pulley, then around the large pulley and extending it to the opening of the cargo area;
   n. forming a handle by threading the rope's front end through a hollow rigid plastic tube, looping the rope back on itself and securing the rope in position using a clamping means;
   o. placing a bumper guard into the vehicle's cargo area in such a way that it extends over a bumper of the vehicle;
   p. placing a piece of cargo to be lifted on the ground near the center of the opened cargo door;
   q. attaching the small pulley to the cargo to be lifted using a cargo attachment means;
   r. pulling on the handle with one hand; and
   s. guiding the cargo into the vehicle's cargo area with the other hand.

* * * * *